US005762739A

United States Patent [19]

Lenhardt et al.

[11] Patent Number: 5,762,739

[45] Date of Patent: Jun. 9, 1998

[54] PROCESS AND APPARATUS FOR ASSEMBLING INSULATING GLASS PANES WHICH ARE FILLED WITH A GAS OTHER THAN AIR

[75] Inventors: Karl Lenhardt, Neuhausen-Hamberg; Uwe Bogner, Pforzheim-Huchenfeld, both of Germany

[73] Assignee: Lenhardt Maschinenbau GmbH, Neuhausen-Hamberg, Germany

[21] Appl. No.: 734,841

[22] Filed: Oct. 22, 1996

Related U.S. Application Data

[63] Continuation of Ser. No. 400,393, Mar. 7, 1995, abandoned, which is a continuation of Ser. No. 192,434, Feb. 7, 1994, abandoned, which is a continuation of Ser. No. 613,504, Nov. 5, 1990, Pat. No. 5,366,574.

[30] Foreign Application Priority Data

| | | | |
|---|---|---|---|
| May 4, 1988 | [DE] | Germany | 38 15 139.1 |
| Sep. 28, 1988 | [DE] | Germany | 38 32 836.4 |

[51] Int. Cl.$^6$ .......... C03C 27/00

[52] U.S. Cl. .......... 156/109; 156/107

[58] Field of Search .......... 156/109, 102, 156/104, 107, 145, 292, 81, 285; 141/4, 7, 59, 66; 65/58

[56] References Cited

U.S. PATENT DOCUMENTS

| | | | |
|---|---|---|---|
| 4,406,726 | 9/1983 | Lisec | 156/360 |
| 4,886,095 | 12/1989 | Lisec | 156/102 |
| 4,921,022 | 5/1990 | Lisec | 141/59 |
| 5,110,337 | 5/1992 | Lisec | 141/4 |
| 5,350,469 | 9/1994 | Lenhardt | 156/109 |
| 5,413,156 | 5/1995 | Lisec | 156/102 |
| 5,476,124 | 12/1995 | Lisec | 156/102 |

FOREIGN PATENT DOCUMENTS

| | | |
|---|---|---|
| 0056762 | 7/1982 | European Pat. Off. . |
| 2099057 | 5/1981 | United Kingdom . |

*Primary Examiner*—Daniel Stemmer
*Attorney, Agent, or Firm*—Dvorak & Orum

[57] ABSTRACT

For filling the insulating glass panes with a heavy gas, one of the glass plates (40) which are to constitute the insulating glass pane is only partly joined to she other glass plate (42) before the assembling, particularly in that said one glass plate is bent so that a gaplike opening temporarily remains between the glass plate (40) and the spacer (41) and the interior space of the insulating glass pane can be filled with a heavy gas through said gaplike opening.

1 Claim, 10 Drawing Sheets

Fig. 14
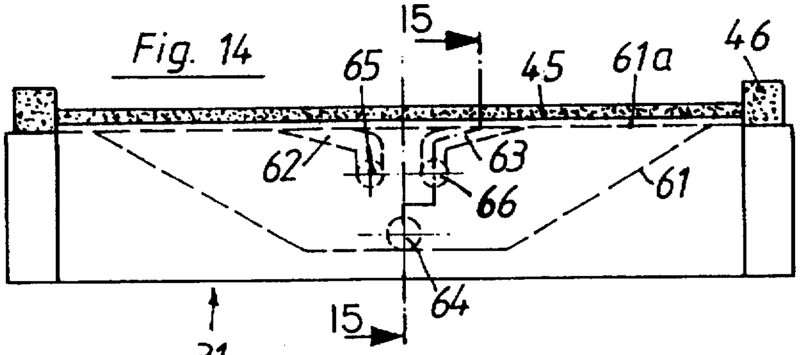
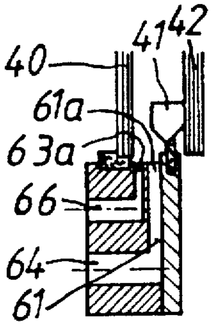
Fig. 15
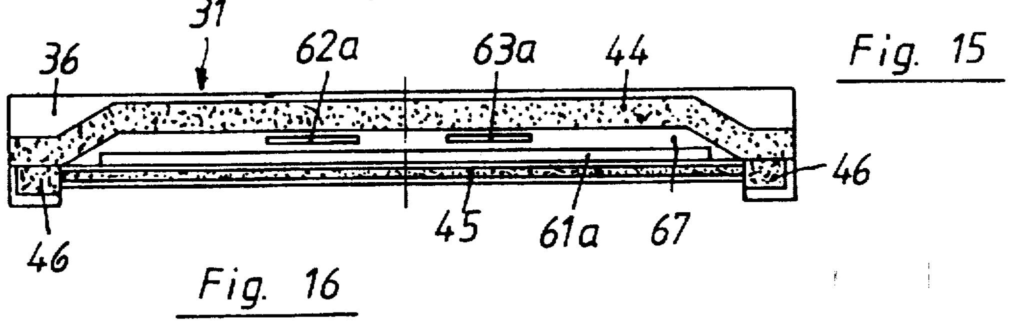
Fig. 16
Fig. 17
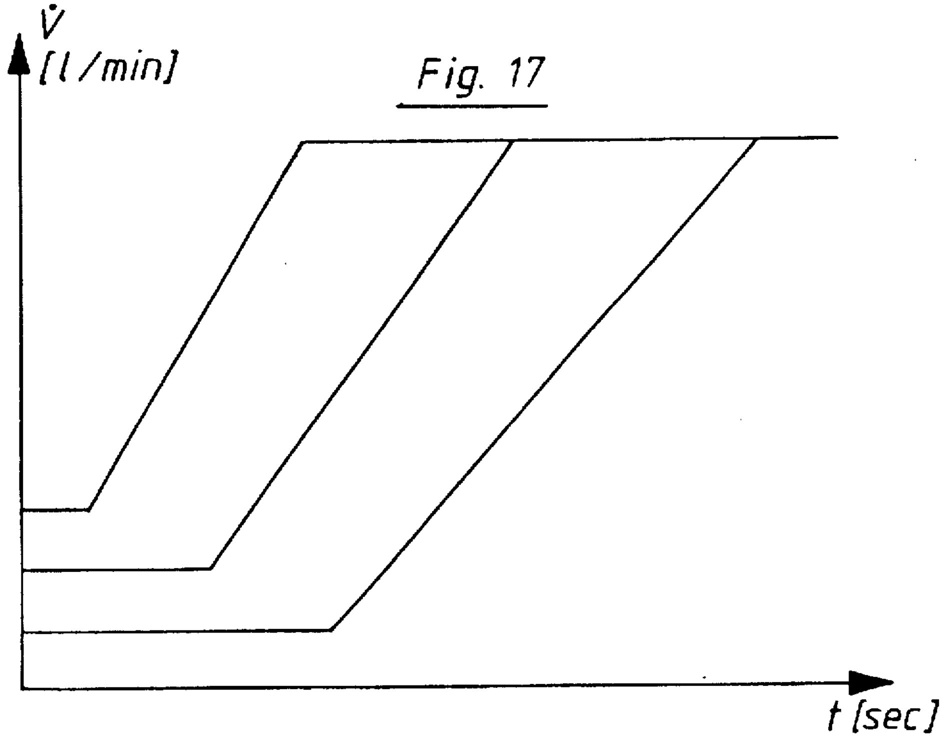

PROCESS AND APPARATUS FOR ASSEMBLING INSULATING GLASS PANES WHICH ARE FILLED WITH A GAS OTHER THAN AIR

This application is a continuation of application Ser. No. 08/400,393, filed 7 Mar., 1995 now abandoned, which is a continuation of application Ser. No. 08/192,434, filed 7 Feb., 1994 now abandoned, which is a continuation of application Ser. No. 07/613,504, filed 11 May 1990, now U.S. Pat. No. 5,366,574.

This invention relates to a process of assembling insulating glass panes which have an interior space disposed between pairs of glass plates, which are spaced apart along their edges by a framelike metal or plastic spacer and are adhesively joined to each other and in said interior space are filled with a gas other than air. From German Utility Model 87 15 749 it is known that insulating glass panes which are adhesively joined at their edge can be filled with a heavy gas if a spacer consisting of a metallic tubular frame is made before said insulating glass pane is assembled. That frame is formed at least at two points with through bores, which are about 4 mm in diameter. Even the manufacture of a spacer having such through bores involves technical problems because such spacer usually consists of a tubular bar, which is perforated on that side which faces the interior of the pane and is filled with a granular desiccant, which serves to bind moisture contained in the interior space of the pane. To prevent an escape of the granular desiccant from the bores provided for the filling with a heavy gas, it is necessary to keep the bored-through leg of the spacer free from desiccant so that the amount of moisture which can be adsorbed will undesirably be decreased, or to seal the bore to the adjoining cavity of the tubular spacer bar, e.g., in that a sleeve is inserted into the spacer or in that the outer wall of the spacer is forced in against the wall which faces the interior of the pane. The forcing-in must so be performed that the two side faces of the spacer remain exactly planar because they must adhesively be joined to the two planar glass plates. To that end, they are usually coated with an adhesive, particularly with a polyisobutylene.

For the assembling of an insulating glass pane it is known to place a spacer, which is coated on both side faces, onto a first glass plate in pressure contact therewith, then to place a second glass plate on the spacer in pressure contact therewith, and to press the resulting unit to a predetermined thickness, particularly between two planoparallel plates.

It is also known that the pressed insulating glass pane can subsequently be filled with a heavy gas, for instance, with argon or sulfur hexafluoride $SF_6$. To that end, a filling probe is inserted into one of the bores of the spacer and the heavy gas is filled through said probe into the interior space of the heavy gas. At the same t me, a suction probe is inserted into the second bore of the spacer (DE 31 17 259 C1, DE 31 17 256 C2), or a suction head is placed on the spacer adjacent to the second bore. In that case the insulating glass pane is filled with the heavy gas at a first location and air and subsequently an air-heavy gas mixture is sucked off through another bore of the spacer at a second location, which is as remote as possible from the first. That operation is continued until the insulating glass pane has sufficiently been filled with heavy gas, as may be checked by an oxygen-sensitive sensor, which may be introduced into the interior space of the pane through a third bore of the spacer or may be introduced into the gas stream which is sucked from the second bore. The insulating glass pane stands preferably upright during its assembling and filling with a heavy gas and the bore used to fill the pane is preferably disposed on the lowest possible level and the suction bore on the highest possible level. Because the heavy gas has a higher specific gravity than air, the heavy gas introduced on the lower level will progressively displace the air upwardly in the insulating glass pane. Substantial losses of heavy gas may be avoided if the flow-in velocity of the heavy gas is sufficiently low during the filling operation. In that case, however, the filling with heavy gas is by far the slowest process step in an insulating glass production line so that the output of such line in case of a filling with a heavy gas will be considerably lower than that of an insulating glass production line without a filling with heavy gas. In order to avoid that it has been proposed in German Utility Model 87 15 749 to cause the heavy gas to flow into the insulating glass pane at a high velocity. Whereas this will reduce the filling time, strong turbulences will arise within the pane so that the heavy gas will intensely be mixed with the air and before a sufficient degree of filling with heavy gas has been achieved a substantial part of the heavy gas will be sucked off with the air and will be lost. Heavy gas losses of as much as 100% are usual in the known process. Besides, the blowing of the heavy gas at a high velocity will result in a superatmospheric pressure in the space between the two glass plates and that pressure acts on the large surfaces of said plates and tends to bulge them. The gas pressure acts also on the spacer and tends to force also the spacer outwardly and to bulge it. In order to avoid that it is proposed in German Utility Model 87 15 749 to use a superheavy precision surface press, by which the insulating glass panes are clamped to have snugly contacting surfaces during the filling with heavy gas so that the glass plates and the spacer cannot bulge. In that case a highly expensive apparatus is required for the filling with heavy gas.

It is also known to assemble the insulating glass pane in a chamber which is filled with a heavy gas instead of air. But the assembling in such chamber is so expensive and involves so high losses of heavy gas that it is not economical.

It is an object of the invention to point out how insulating glass panes can be filled with heavy gas quickly and with a lower expenditure than before.

That object is accomplished by a process having the features recited in claim 1. Apparatuses which are particularly suitable for carrying out the process are the subject matters of the independent claims 22 and 23. Desirable developments of the invention are the subject matters of the respective dependent claims.

The invention constitutes a radical departure from the known process because the access to the interior space of the insulating glass pane for the gas with which the insulating glass pane is to be filled is no longer provided by through bores in the spacer but the assembling of the insulating glass pane is so altered that one and preferably two access gaps through which the gas can be introduced into the interior space between the two glass plates is or are temporarily maintained between the spacer and one or both of the adjoining glass plates, preferably between the spacer and only one of the glass plates. During the introduction of the gas the interior space between the glass plates is already closed by the spacer with the exception of said access gaps. An access gap may be provided in that the glass plates are initially adhesively joined along one of their edges and for that purpose the glass plates are not arranged exactly parallel to each other but with a small acute included angle so that the interior space between the glass plates has the shape of a gentle wedge. The angle need not be larger than is required to provide an access in a width of about 2 mm at that edge of the glass plates which is opposite to the apex of the angle. A heavy gas may then be caused to flow into the wedge-shaped interior space. To reduce gas losses, the access to the interior space is suitably covered to a large extent during that operation. But an access gap is preferably provided in that one glass plate is elastically bent. In accordance with the invention a glass plate which is planar when it is not acted upon by external forces is elastically bent so that only portions of its edges lie in a common plane. When the glass plates and the interposed spacer have then been assembled and at least one glass plate is still bent there will be a narrow access to the interior space between the glass plates and that space can then be filled with a gas. By a bending of the glass plates it can easily be achieved that the access is approximately of equal size for the various glass plate sizes used in the practice of insulating glass plate production. This is a great advantage in the practice of the process. Compared to the assembling of two glass plates so that they initially define an acute angle the bending of the glass plates affords the further advantage that the interior space of the insulating glass pane will be very substantially closed without a need for further measures so that glass losses can more easily be avoided during the production of the gas.

The advantages afforded by the invention over the known process are highly convincing:

The spacer need not be different from a spacer for insulating glass panes which are not to be filled with a special gas so that additional operations on the spacer will not be required. Specifically, it is not necessary to bore through and reseal the spacer at two or three locations. All operations performed on the spacer for that purpose in the known process will be avoided in the process in accordance with the invention. Besides, the spacer is not at all weakened by any bores.

In the known process the space between the plates is filled through a bore which is formed in the spacer and is relatively narrow-about 4 mm in diameter so that the open cross-section is about 12 $mm^2$—the invention permits much larger and desirably elongate gaplike accesses to be provided between the spacer and the glass plate; in experiments, the bending of only one glass plate has resulted in open areas which were more than 20 times as large as in the known process. As a result, the space between the two glass plates can be filled with a gas which flows at such a low velocity that turbulences which are as strong as those occurring in the process known from German Utility Model 87 15 749 will not occur in the process in accordance with the invention. On the contrary, the air can be displaced in a uniformly progressing manner from the space between the two glass plates by a gas which flows in slowly in a large width, particularly if—as is preferred—the glass plate is so bent that two access gaps are provided on mutually opposite edge portions of the insulating glass pane. If the gas is permitted to flow in over a large width through one of said gaps, the gas will displace the air ahead of the gas and will not substantially mix with the air and will displace said air outwardly through the opposite gap. The displacement may be assisted by suction. In the process in accordance with the invention the gas losses resulting from a discharge of air-admixed gas from one gap can be kept much lower than in the known process.

But because the gas losses can be kept lower, such filling gases may be used which require that the gas losses will be particularly low owing to their price or the risk of a possible pollution of the working place.

Owing to the low filling velocity, only a negligibly low dynamic pressure can build up in the space between the two glass plates and the occurrence of such pressure need not be prevented by any measures as are required in the known process. Specifically, it is not necessary to use the "superheavy precision surface press" required in the known process.

Because the spacer need not be bores through, it may be filled with a granular desiccant all around, in all its legs.

Whereas in the known process the bores in the spacer must be closed in a complicated manner after the filling operation, the insulating glass pane can be closed in a very simple manner in accordance with the invention in that the glass plate which initially does not completely contact the spacer is then caused to contact the spacer. If the glass plates extended at an acute angle to each other during the filling operation it will be sufficient to pivotally move one glass plate against the other. The glass pane can be closed in a particularly elegant manner if one glass plate has elastically been bent and the forces by which the glass plate is held in its bent shape are gradually removed. In that case the bent glass plate owing to its elasticity will automatically re-assume its original shape in that it moves into resilient contact with the spacer and thus closes the space between the glass plates extremely quickly so that the filled-in gas has virtually no opportunity to escape after the end of the filling operation. This is different in the known process, in which a relatively long time elapses between the end of the filling operation and the closing of the bores.

As will be shown further with reference to an illustrative embodiment, the process in accordance with the invention can be carried out in a conventional insulating glass production line, which needs to be modified with a relatively low expenditure only adjacent to the assembling station. If a gap for admitting the filling gas is to be formed in that the glass plates are arranged at an acute angle, it will be sufficient in the assembling station, which is provided with two mutually opposite pressing plates, which are spaced a variable distance apart, to pivot one of the existing press plates, which preferably consists of a suction plate for retaining one glass plate, so that said one press plate can move through a corresponding small angle. It is not difficult to cover the space in the pane at three edges in order to avoid gas losses during the filling operation because two of the three edges to be covered may have the same position in the assembling station for all glass plate sizes so that covering elements can easily be moved into contact with the edges.

If a gap for the filling with the gas is to be formed by a bending of one glass plate, the press plate in the assembling station may be provided with an aperture, in which a suction device is disposed, by which the glass plate is sucked and is drawn against the abutment that is constituted by the edge of the aperture so that the glass plate will be bent. Such a modified assembling station can readily be used to assemble also insulating glass panes which are not to be filled with a gas that is different from air. Thus, the process in accordance with the invention permits an extremely rational work. One and the same production line may be used to make heavy gas-filled and air-filled insulating glass panes in any desired sequence. Whereas there are spacers which are so flexible that they can be bent together with a glass plate, it will be preferred to bend the glass plate before it is joined to the spacer so that the provision of an access leading to the interior space of the insulating glass pane will not depend upon whether and to what extent the employed spacer is flexible. That practice will be particularly recommendable in the manufacture of insulating glass which is adhesively joined at the edge and which is made with spacers which consist of tubular metal bars and are provided on both side faces with an adhesive for adhesively joining the two glass plates. On principle, both glass plates might be bent to provide a larger access to the interior space of the insulating glass pane. But it has been found that the increased expenditure involved in such practice will not be required and that it will be sufficient to bend only one of the glass plates. In that case it is preferred first to place the spacer on the glass plate which is not to be bent. This will afford the advantage that the spacer will not be subjected to flexural stress and will be held and supported all around. Thereafter the bent glass plate is placed onto the spacer and because the glass plate is bent also at its edge this will necessarily leave an opening between the bent glass plate and the spacer.

In an alternative practice, both glass plates are initially completely applied to the spacer and one of the two glass plates is then bent so that it is partly detached from the spacer if this is permitted by the adhesive that is employed. It will be possible with butyl rubber adhesives unless they have been pressed too strongly.

It will make no difference in principle how the glass plate is bent and where the resulting accesses are located. For instance, one glass plate might be bent adjacent to two diagonally opposite corners in such a manner that its outside surface is concave there so that the corners have been bent away from the spacer; the gas could then be filled in adjacent to one corner and the air might be sucked or displaced at the opposite corner. Alternatively, one or the other glass plate may be bent off along one of its edges and the gas may then be caused to flow in near one corner and may be sucked off or displaced out at that edge near the other corner. But it will be preferred so to bend the glass plate concerned that its outside surface is convex and particularly so that it is bent at two mutually opposite edge portions whereas the intervening other edge portions substantially preserve their original shape, i.e., lie in a plane if the glass plates are planar. In that case the glass plate is formed with a bulge which is similar to a barrel vault, and is provided on both sides of the bulge with unbent edge portions which constitute sections in contact with the spacer so that the space between the two glass plates is closed with the exception of two mutually opposite gaps, which have a configuration resembling the cross-section of a planoconvex lens.

In principle, the insulating glass pane might be filled in a horizontal orientation. In that case one of the glass plates may lie on a table and the second may be arranged over the first and may be held, e.g., by a suction device. But it is preferred to fill the insulating glass pane while it is standing on edge and the two gaps between the bent glass plate and the spacer are preferably disposed one over the other. During the filling with a heavy gas, the latter is suitably introduced through the lower gap and is permitted to rise in the space between the two glass plates so that the gas displaces the air out of the interspace through the upper gap. To permit the heavy gas to be more easily and more quickly introduced into the regions of the lower corners of the insulating glass pane, the stream of the heavy gas may be fanned in various directions by the provision of suitable guiding elements in a feed nozzle, which is arranged at the lower access to the insulating glass pane.

A glass plate might be bent in that two of its mutually opposite edges are forced against each other so that the glass plate is bulged. Alternatively, the glass plates may be horizontally arranged and the bottom glass plate may be supported only in part so that it sags under its own weight. In practice, both possibilities are less favorable than the preferred practice, in which the glass plate concerned is bent in that it is sucked at one or more portions of its outside surface whereas forces which are directed oppositely to the suction force are exerted on the outside surface of the plate at locations which are remote from said sucked portions. In that case the glass plate can be bent conveniently and regardless of its orientation by the mere exertion of forces on the outside surface of the plate. In order to achieve the preferred shape of the glass plate, which is similar to a barrel vault, a wall may be provided and for use with planar glass plates that wall suitably has in a major portion a planar surface and has a striplike aperture or gap, which is preferably about 30 cm wide. A suction cup which is movable forwardly and rearwardly relative to the surface of the wall, or preferably a row of such suction cups, may be provided in that aperture and may be applied to the outside surface of the glass plate. When the suction cups have sucked the glass plate, they are retracted behind the surface of the wall so that the outside surface of the glass plate moves against the edges of the aperture and said edges act as an abutment and in cooperation with the retracting suction cups cause the glass plate to be bent. A wall having an aperture may be constituted by two correspondingly spaced apart walls. The striplike aperture or gap in which the suction cups are arranged is desirably disposed in the middle portion of the glass plate that is to be bent.

The suction cups preferably adjoin each other and can individually be activated so that the suction force for the bending can be exerted in an optimum manner and in adaptation to the size of the glass plate concerned.

The walls are preferably provided with a number of bores, which are distributed over the surface of the walls and through which air can selectively be blown or sucked. For the transportation of the glass plates along the wall concerned, air is blown through said bores to form an air cushion between that wall and the glass plate. To hold the glass plate before and during the bending operation, air is sucked through said bores so that the glass plate is sucked to the wall and the glass plate is desirably in a snugger contact with the glass plate during the bending operation than without such suction. But the means for holding the glass plate that is to be bent need not consist of an air cushion wall. For horizontal glass plates such means might consist of a roller bed table, which has suction cups which can be raised and lowered and used for the bending operation. Alternatively the holding means might consist of a frame, which is provided with clips, which grip the glass plate at its edge. The holding means might be an array of suction cups, the front faces of which define a common surface, in which the outside surface of the sucked glass plate is disposed, and additional suction cups may be provided, which can be advanced as far as to that common surface.

In view of the fact that in accordance with the invention there is an elongate opening between the spacer and one glass plate and said opening is used to feed the gas and to suck off the gas-air mixture, the gas is desirably fed by means of a nozzle having a correspondingly elongate mouth, which is contacted with the edge of the glass plates or with the edge of one glass plate and with the spacer so that a maximum efficiency is achieved. Such an elongate nozzle might also be used to suck off the gas-air mixture. A further advantage afforded by the use of a nozzle having an elongate mouth for feeding the gas resides in that the nozzle can be divided into a plurality of sections, which contain guiding elements for fanning the gas stream into different outflow directions. This permits said sections to be separately fed with the gas by means of separate supply lines and thus to achieve an optimum adaptation of the filling operation to the size of the glass plate concerned. A further adaptation will be permitted if the guiding elements are replaceably arranged in the nozzle.

Another desirable option resides in that a plurality of nozzles having different discharge directions are provided in the means for feeding the gas and are provided with separate supply lines for the gas and can be supplied independently of each other. Two such nozzles in a V-shaped array are preferably provided as well as a third nozzle (subsequently called main nozzle) for discharging in a direction which lies between the discharge directions of the nozzles of the V-shaped array and having a mouth which is preferably longer than the mouth of the nozzles of the V-shaped array and is preferably approximately as long as the access to the interior space of the insulating glass pane. For an optimum shielding of the access to the interior space between the glass plates, it is recommendable so to design the means for feeding the gas that the various nozzles are disposed in a common narrow chamber, which is movable into engagement with the edge of the insulating glass pane. Such a nozzle will permit a highly advantageous process of introducing the gas into insulating glass panes which stand upright or are inclined: The gas is preferably caused to flow in slowly initially through the main nozzle from the bottom edge. Being heavier than air, the gas flows upwardly and also toward the two rising legs of the spacer and will thus reach also the lower corners of the interior space of the pane and rises gradually in a large width. The gas is preferably fed at a very low rate because in that case the gas will be particularly ready to flow along the bottom edge of the interior space of the pane and will reach the two lower corners. The gas flow rate is then gradually increased, preferably linearly. As soon as an escape not only of air but also of some gas from the gap at the top edge of the insulating glass pane is detected, the main nozzle is closed and the gas is caused to flow in through the nozzles of the V-shaped array so that a flow is enforced which reaches also the two upper corners of the interior space of the pane and displaces the air from said corners and imparts a swirl to said air. To ensure that an excessive downward movement of the air owing to the swirl will be prevented and that the air will be displaced from the interior space through the gap at the top edge of the insulating glass pane, the nozzles of the V-shaped array are closed when they have been open for a short time and then the main nozzle is re-opened so that the air which has been moved by the swirl flow out of the top corners will be displaced upwardly through the gap. The filling operation will be terminated when a measuring probe indicates that the oxygen content of the escaping gas stream is below a predetermined limit. That process permits a very fast and very complete filling of insulating glass panes and will substantially avoid any turbulence in the interior space of the pane during the filling operation.

In order to minimize the gas losses, the mouth of the means for feeding the gas and optionally also the mouth of a suction nozzle is preferably surrounded by seals, which are to engage the glass plates and/or the spacer. Particularly desirable arrangements of seals are subject matters of claims 43 to 45.

If a nozzle is employed to suck off the gas-air mixture, that nozzle will desirably be opposite to the means for feeding the gas and will preferably be disposed above said means if the glass plates stand on edge. In that case an adaptation to various glass plate sizes must be permitted in that the distance from the suction nozzle to the horizontal conveyor is variable and to that end the suction nozzle is suitably mounted on a carriage. Preferably the suction nozzle is not fixedly mounted on the carriage but is connected to the carrier by a four-bar linkage so that the suction nozzle can be displaced at a distance from the walls and suction cups of the assembling station in that one lever of the four-bar linkage is so arranged that it will engage the glass plate earlier than the suction nozzle. When the movement of the carriage is then continued, the four-bar linkage will be distorted and the suction nozzle will be pulled toward the wall. If the four-bar linkage is suitably designed the nozzle will reach the wall at the instant at which the nozzle is in sealed contact with the glass plate which contacts the wall.

But it is by no means necessary to suck the air from the interior space of the insulating glass pane during the feeding of the gas into that space. In order to avoid turbulences it will even be desirable to omit such sucking-off and to displace the air only by the feeding of the gas. Advantages will even be afforded if the escape of the air from the interior space of the insulating glass panes is somewhat restricted in that the gap through which the air escapes is covered in part so that the desired transverse distribution of the introduced gas in the interior space of the insulating glass pane will be promoted.

The invention is applicable to insulating glass panes consisting of two or more than two glass plates. For making insulating glass panes consisting of three glass plates, a double pane consisting of two glass plates is initially made in the manner described and is then provided with a further spacer, which is engaged by a third glass plate, which is preferably elastically bent, and a further gas filling operation is then carried out as described.

The invention is not only applicable to planar glass plates but also to curved glass plates, such as are required as insulating glass for automobiles.

Illustrative embodiments of the apparatus are diagrammatically shown in the accompanying drawings.

FIGS. 9*a* to 9*d* are diagrammatic illustrations of the use of the nozzle to fill insulating glass panes differing in size with a gas.

Figure 10:
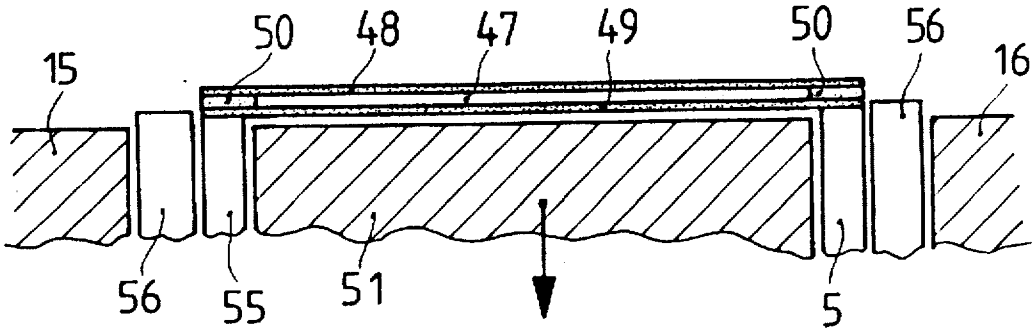

FIG. 10 is a bottom detail view showing a nozzle for sucking an air-gas mixture from the insulating glass panes.

Figure 11:
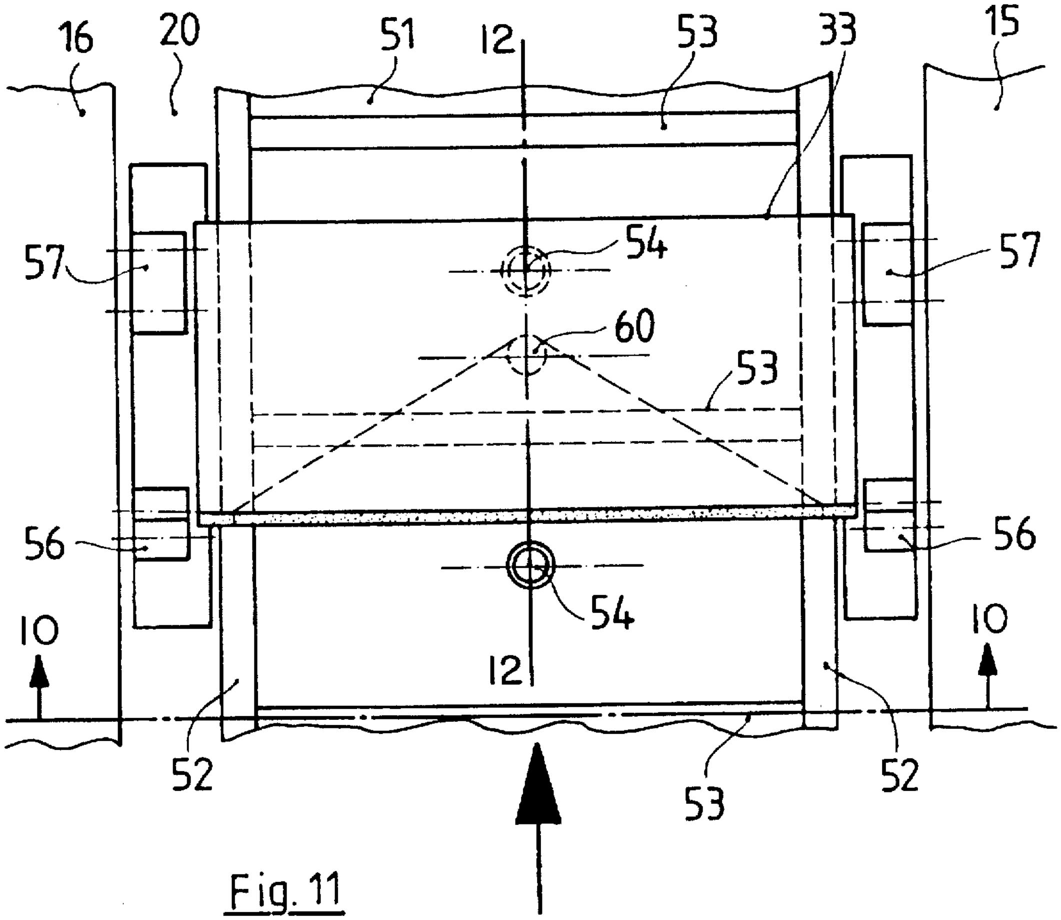

FIG. 11 is a detail front elevation showing the suction nozzle of FIG. 10 and its arrangement in an aperture between two pressing plates of an assembling station.

Figure 12:
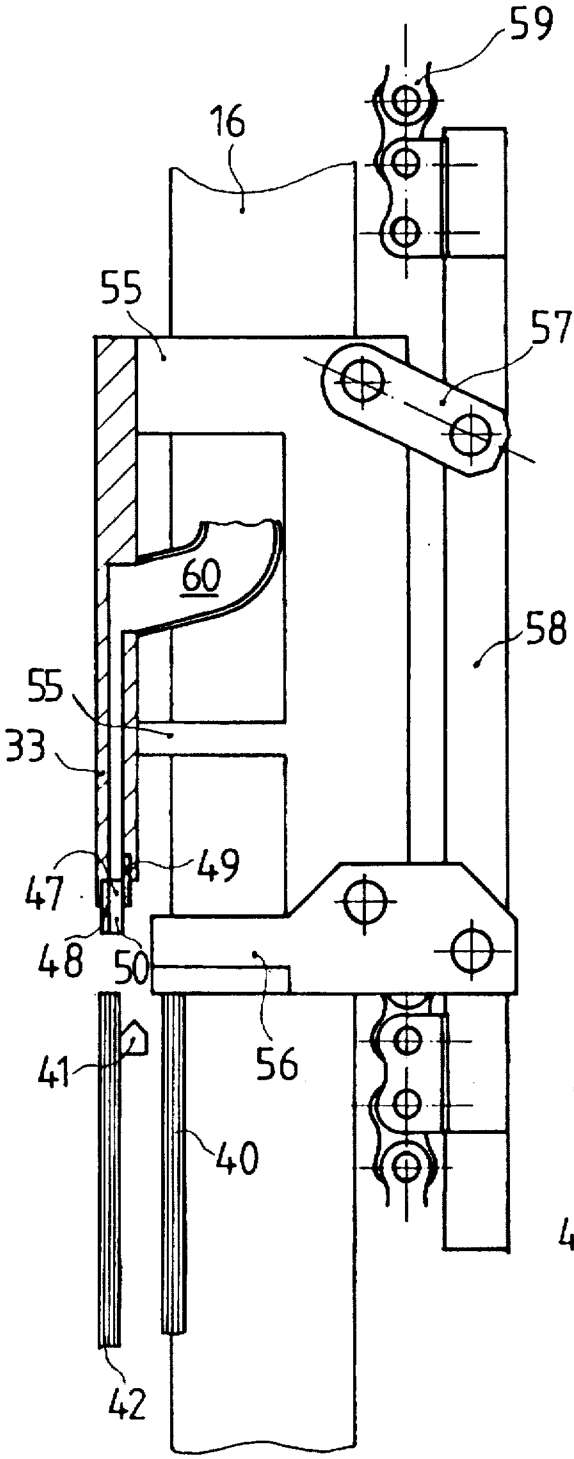

FIG. 12 is a sectional view taken on line D—D and showing the suction nozzle of FIG. 11 and a carriage to which the nozzle is connected by means of a four-bar linkage.

Figure 13:
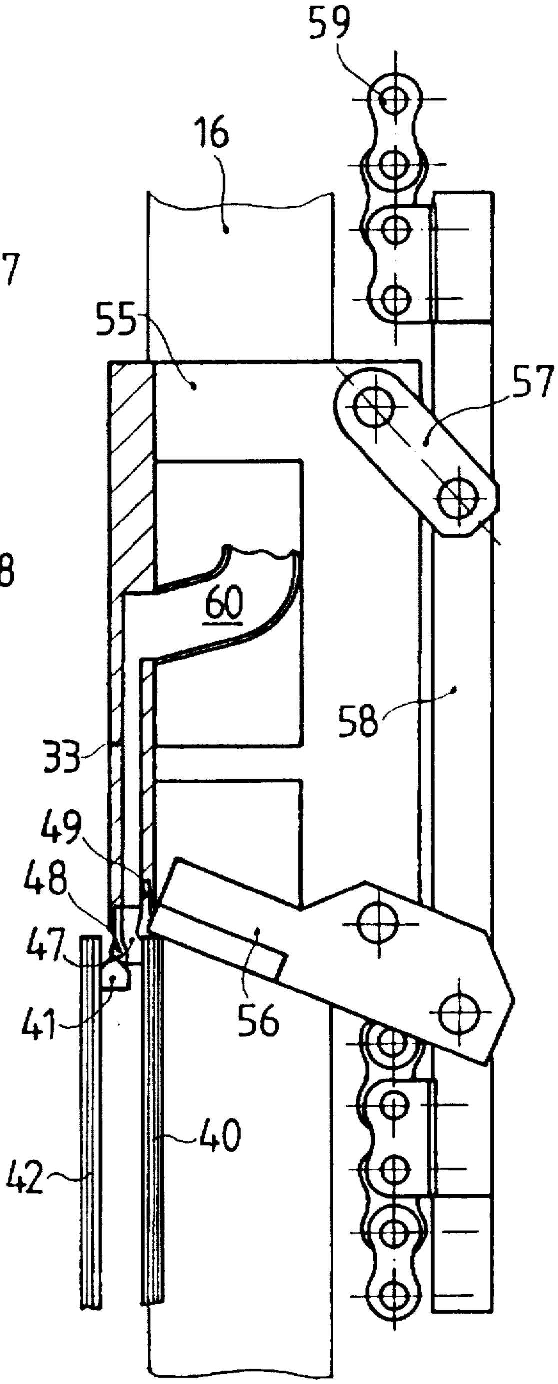

FIG. 13 is a view that is similar to FIG. 12 and shows the suction nozzle applied to a glass plate.

FIG. 14 is a side elevation showing a different embodiment of means for feeding the gas.

FIG. 15 is a sectional view taken on line E—E and showing the means of FIG. 14.

FIG. 16 is a top plan view showing the means of FIG. 14.

FIG. 17 is a graph representing the time course of the gas-filling operation.

Figure 18:
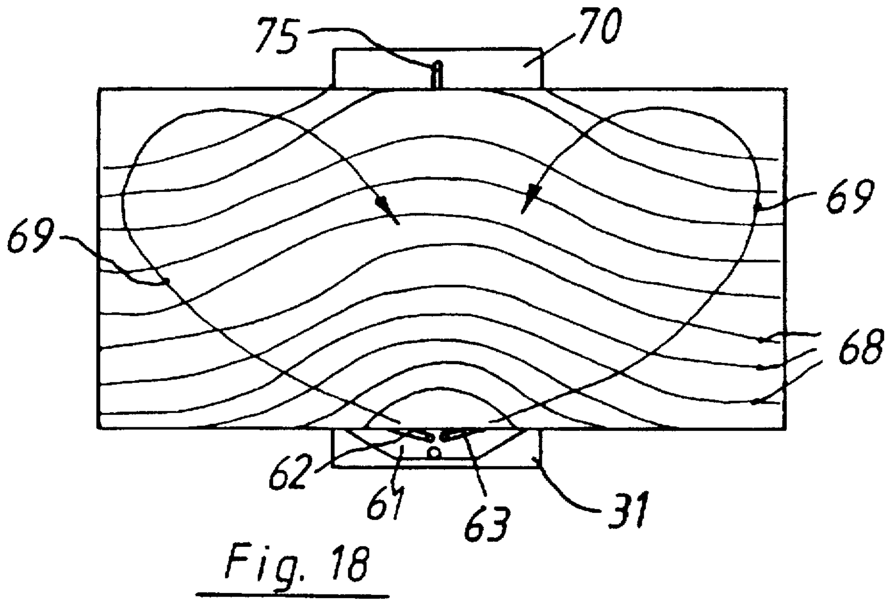

FIG. 18 illustrates the flow conditions in the interior space of an insulating glass pane during a feeding of the gas by the means shown in FIGS. 14 to 16.

Figure 19:
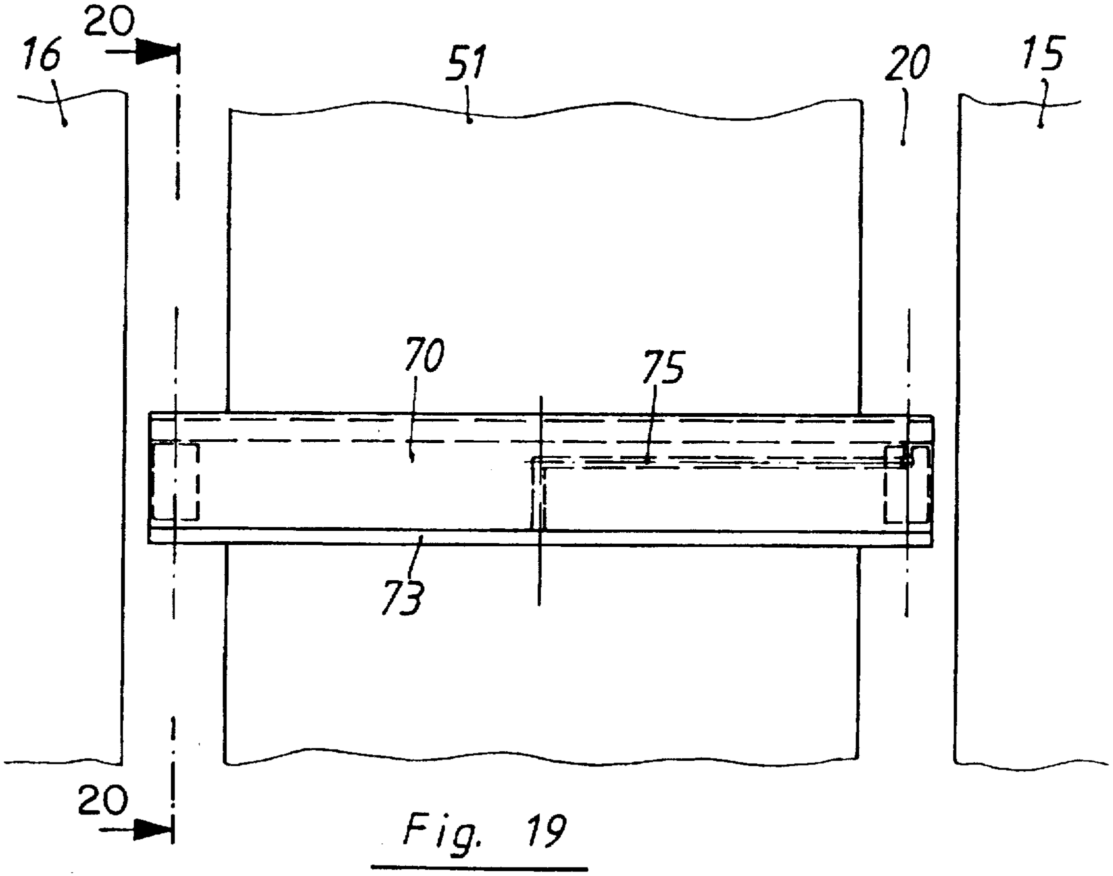

FIG. 19 is a view that is similar to FIG. 11 and shows a covering element that is used instead of a suction nozzle.

Figure 20:
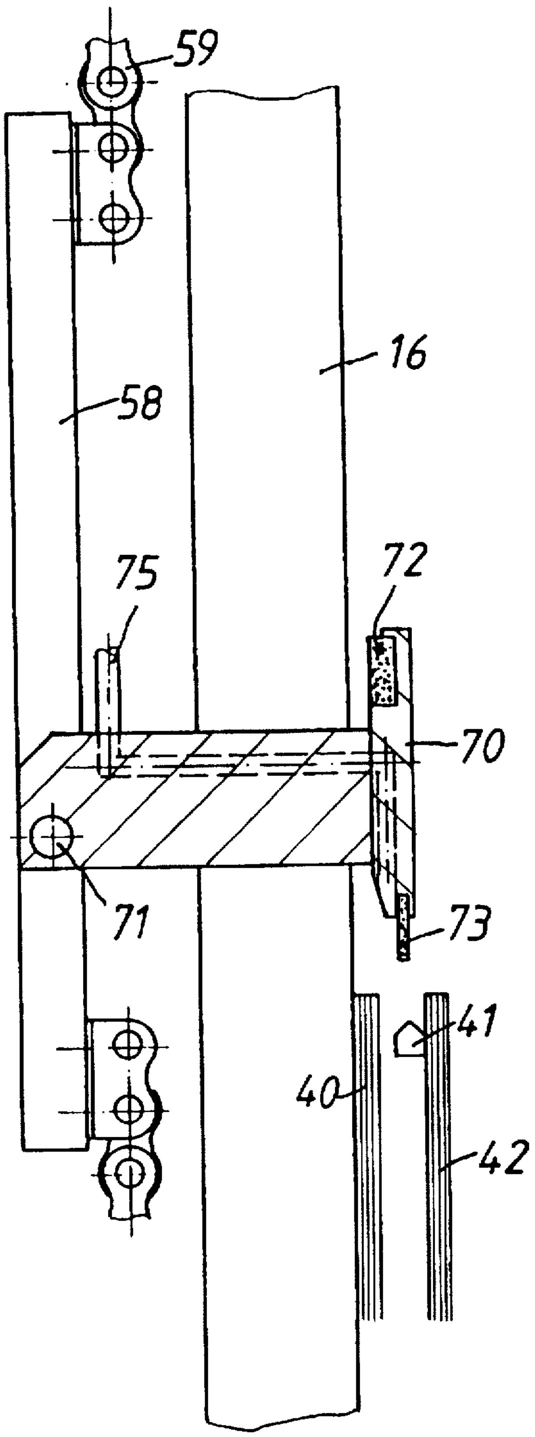

FIG. 20 is a sectional view taken on line F—F and showing the covering element of FIG. 19.

Figure 21:
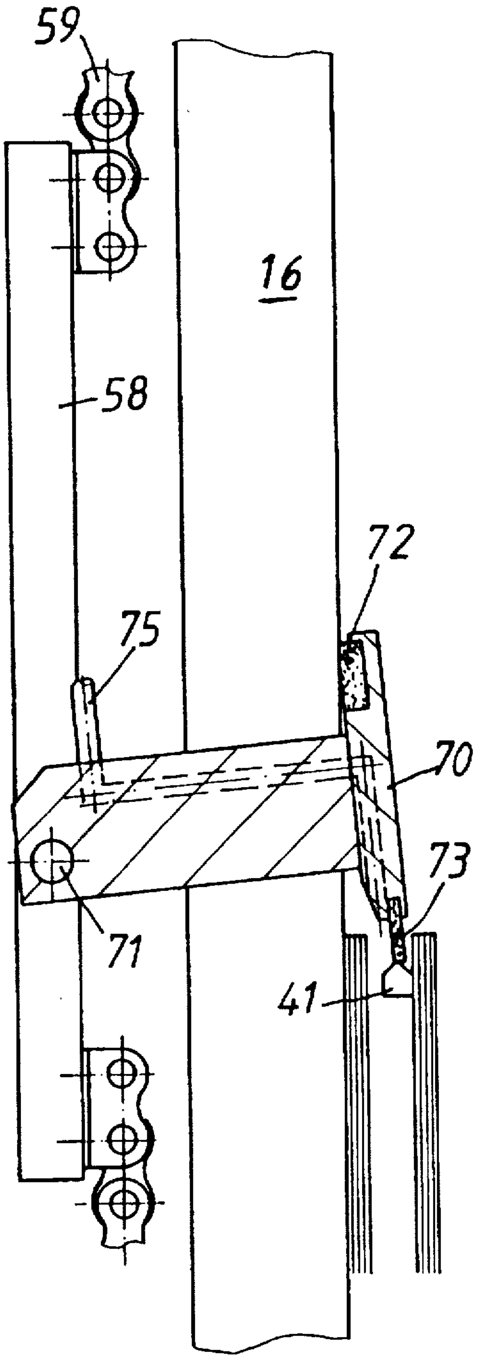

FIG. 21 is a view that is similar to FIG. 20 and shows the covering element placed on the spacer.

Figure 1:
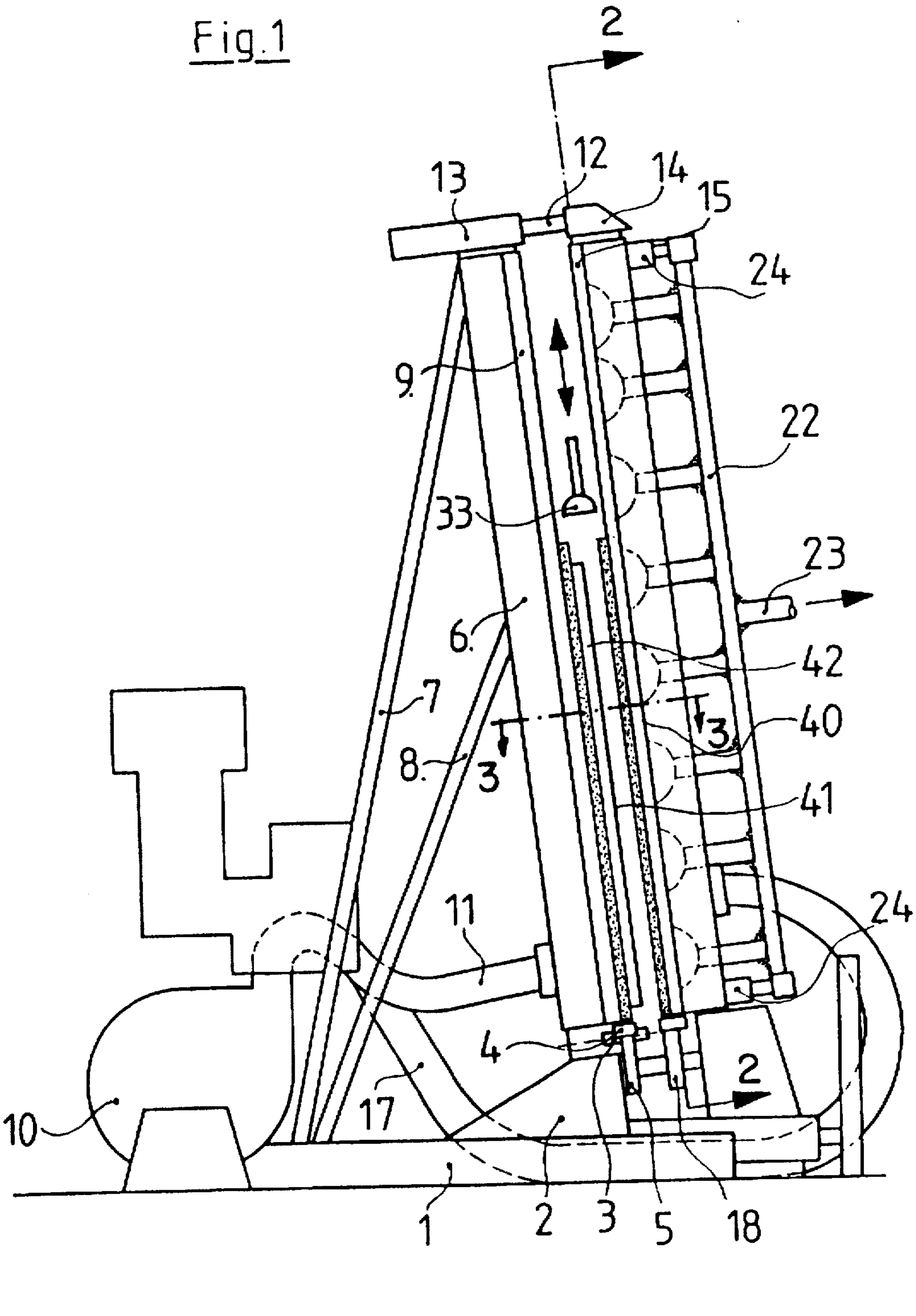
FIG. 1 is a side elevation showing the apparatus.
Figure 22:
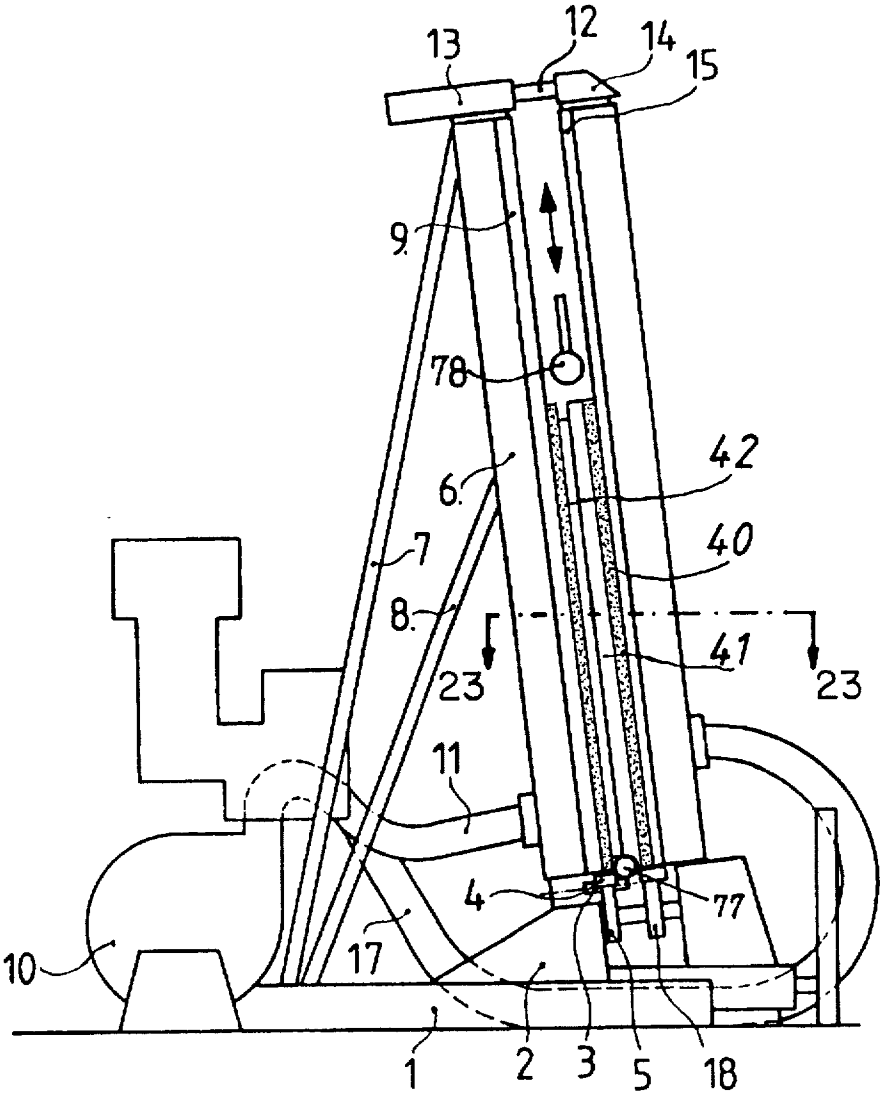

FIG. 22 is a view that is similar to FIG. 1 and shows a different embodiment of the apparatus for assembling an insulating glass in which there is no bending of a glass plate.

Figure 23:
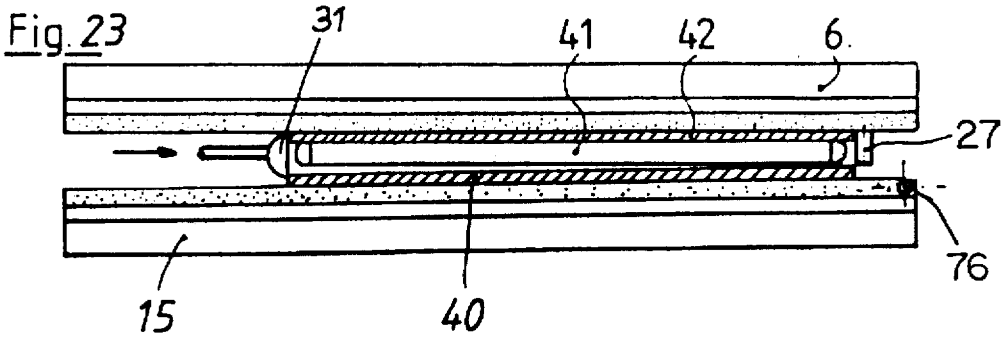

FIG. 23 is a sectional view taken on line H—H and showing the apparatus of FIG. 22.

Figure 2:
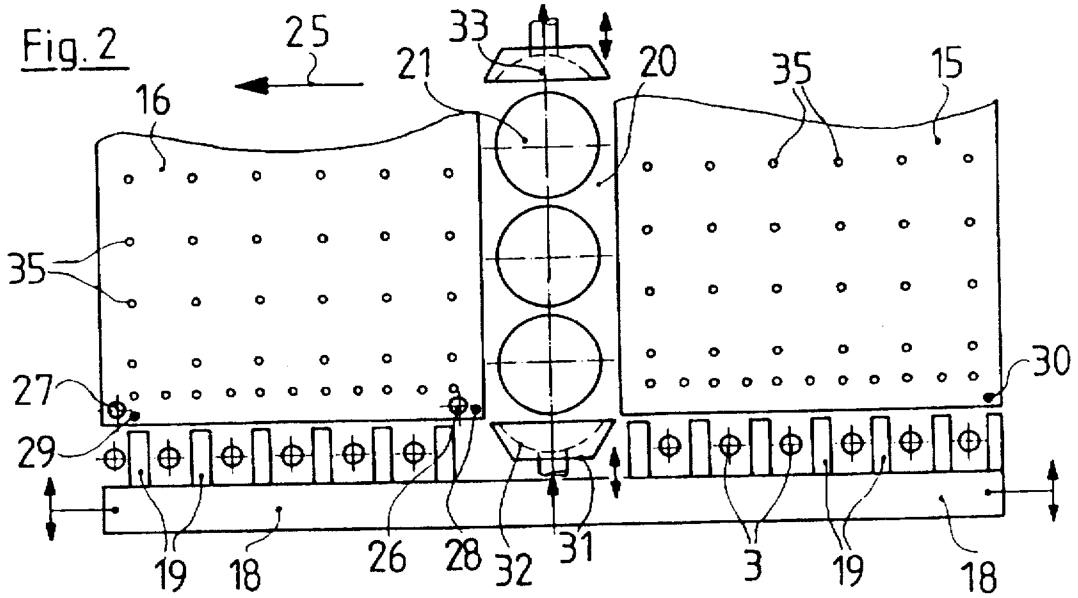
FIG. 2 is a, diagrammatic sectional view taken on line II—II and showing a portion of the apparatus.
Figure 3:
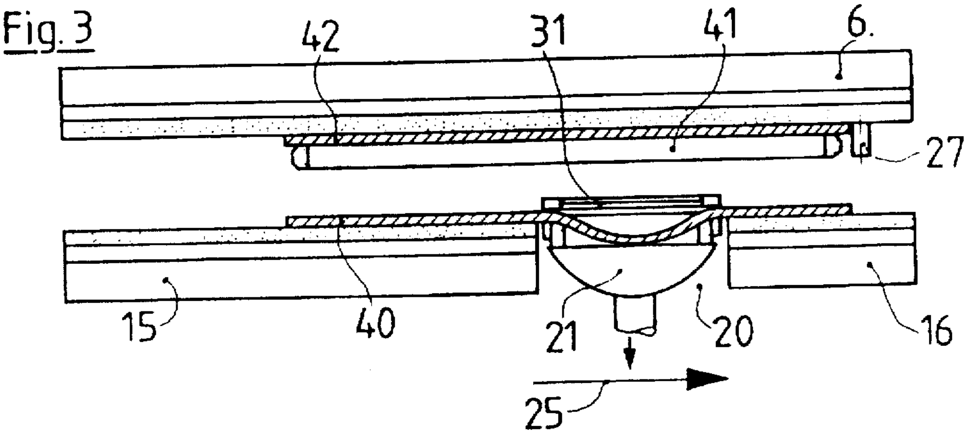
FIG. 3 is a transverse sectional detail view on line III—III showing a portion of the apparatus with two glass plates which have not yet been laid together.

FIGS. 1 and 2 show that the apparatus comprises an underframe 1 and on top of it a base 2, which carries a horizontally conveying conveyor, which is constituted by a series of synchronously driven rollers 3. A support 4 is provided between any two adjacent rollers 3. The series of supports 4 are mounted on a lifting beam 5, which is adjustable up and down so that the supports are displaceable between a position in which they protrude above the rollers 3 and a position in which they are below the top of the rollers 3.

A backing wall 6 is provided above the rollers 3 and is supported by the base 2 and in a position in which it is rearwardly inclined from the vertical by about 6° is backed by struts 7 and 8, which are supported by the underframe 1. The backing wall 6 is designed as an air cushion wall. It consists of a, plate 9, in which a number of bores are distributed, which are supplied with compressed air through a line 11 from a fan 10.

Close to the four corners of the backing wall 6 the frame of the backing wall is provided with four rods 12, which extend at right angles to the backing wall 6 and are forwardly and rearwardly displaceable at right angles to the backing wall 6 by a fluid-operated cylinder 13. The cylinder 13 might be replaced by a screw. The rods 12 carry at their forward end a holder 14, to which a frame is secured, which has two walls 15 and 16, which are parallel to the backing wall 6. The distance of said walls from the backing wall 6 can be changed by an operation of the fluid-operable cylinders 13. The walls 15 and 16 are also designed as air cushion walls and for that purpose are supplied with compressed air from the fan 10 through an additional line 17. Just as the backing wall 9 they are provided with a plurality of bores 35, which are distributed over the surface of the walls and through which the air handled by the fan can flow out or be sucked. A second lifting beam provided with a number of supports 19 is disposed below the walls 15 and 16.

An aperture having a width of about 30 cm is disposed between the two walls 15 and 16 and extends vertically throughout the height of the walls from bottom to top. A plurality of suction cups 21 arranged one over the other are accommodated in that aperture 20 and are secured to a common carrier 22, which consists of a pipe, and communicate through a common suction line 23 with a suction unit. The carrier 22 is connected to the frame of the walls 15 and 16 by fluid-operated piston-cylinder units 24 so that the suction cups 21 can be advanced at least as far as to the forward surface of the walls 15 and 16 and can also be retracted.

Two retractable stops 26 and 27 are provided in the space between the backing wall 6 and that wall 16 which is forwardly disposed in the direction of conveyance 25. One of said stops is disposed near the aperture 20 and the other at the delivery end of the wall 16. Two position sensors 28 and 29 are spaced in front of said stops. An additional position sensor 30 is disposed at the beginning of the backing wall 15.

Means 31 for feeding a gas are provided adjacent to the aperture 20 on the level of the conveyor 3, which is interrupted at that location. Said means consist of a nozzle 31, which is adjustable in height into engagement with the bottom edge of an insulating glass pane. The nozzle 31 extends throughout the length of the aperture 20 and in its interior contains guiding elements 32, which are provided on a replaceable bar (FIG. 7) and which fan the upwardly directed gas stream into different directions. In front of the wall 6, a suction device 33, which is adjustable in height, is disposed opposite to the wall 31 and comprises a drive unit, which is not shown in FIGS. 1 and. 2 for the sake of clearness.

Figure 4:
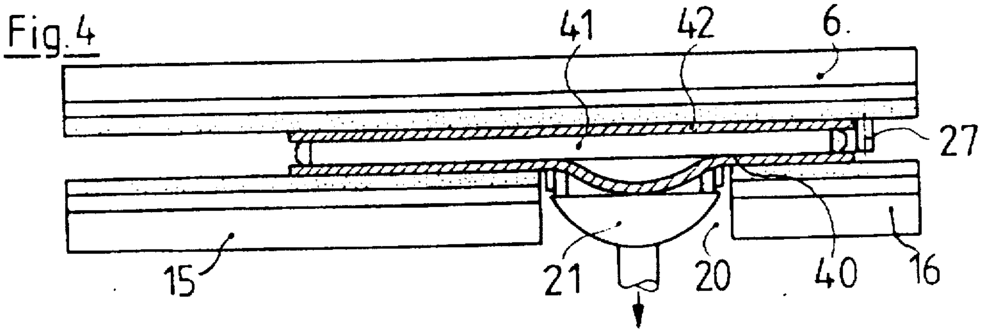
FIG. 4 is a view that is similar to FIG. 3 but with the glass plates laid together.
Figure 5:
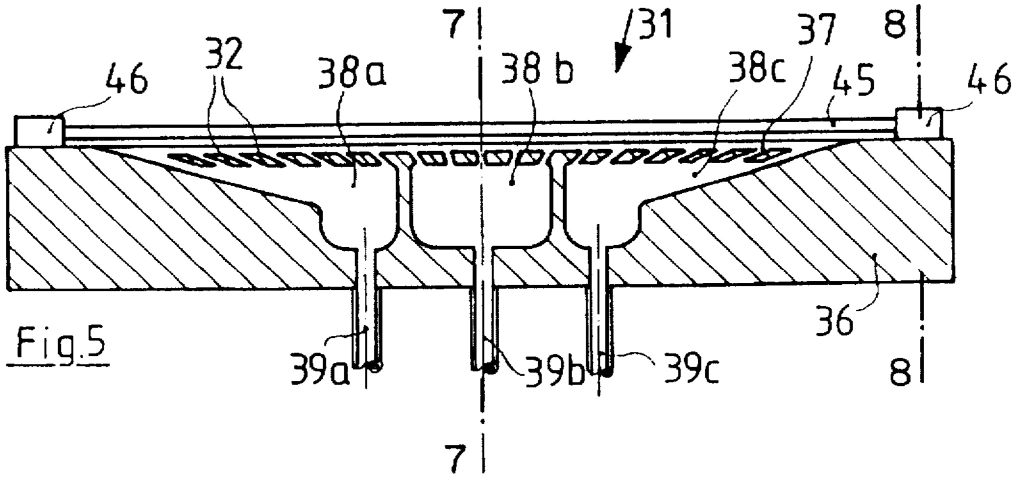
FIG. 5 is a longitudinal sectional detail view showing a nozzle as means for feeding a gas.
Figure 7:
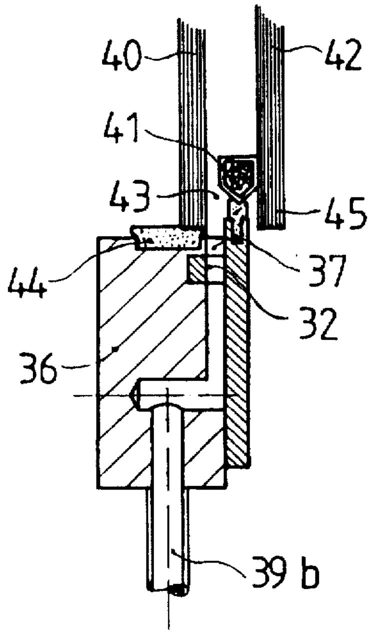
FIG. 7 is a sectional view taken on line B—B and showing the nozzle of FIG. 5.
Figure 8:
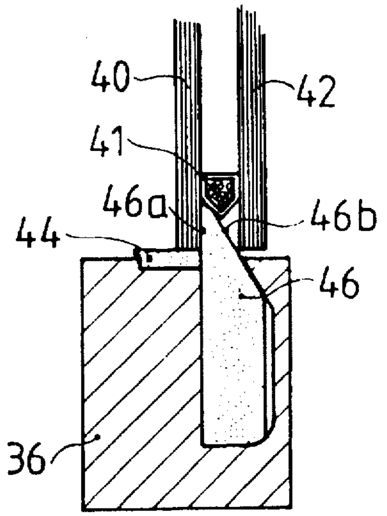
FIG. 8 is a sectional view taken on line C—C and showing the nozzle of FIG. 5.

The nozzle 31 is a flat hollow body 36, in which an elongate nozzle mouth 37 is formed. The nozzle is divided in its longitudinal direction into three sections 38*a*, 38*b* and 38*c*, which are supplied with gas through separate lines 39*a*, 39*b*, 39*c*. The nozzle mouth 37 is lined by seals 44, 45 and 46, which on the longitudinal sides of the mouth consist of two striplike seals 44 and 45, which may consist of foamed rubber. The seal 45 protrudes further from the nozzle mouth 37 than the seal 44 and is engageable with the spacer 41, whereas the seal 44 is engageable with the bottom edge of the glass plate 40, which engages the walls 15 and 16 (FIG. 7). Because the gap between the glass plate 40 and the spacer 41 is lens-shaped in a top plan view (this is exaggerated in FIG. 4), the seal 44 is not perfectly straight but its ends approach the seal 45, which is shorter than the seal 44. Two wedge-shaped seals 46 are provided at the ends of the seal 45 (see FIG. 8) and have a sealing surface 46*a*, which is parallel to the walls 15 and 16 and contacts the seal 44 and beyond the seal 44 contacts the inside surface of the glass plate 40, and also have an oblique sealing surface 46*b* in contact with the spacer 41, which in most cases is formed on its outside with a corresponding oblique surface. Owing to the cooperation of said three seals 44 to 46 the nozzle 31 can engage the bottom edge of insulating glass panes even if they differ in size and thickness and in such a manner that the gaplike opening for feeding the gas is sufficiently tightly sealed. It will be favorable that owing to the bending of the glass plate 40 the gaplike opening will have approximately the same size for glass plates which differ in thickness and size.

The suction device 33 which is disposed opposite to the nozzle 31 also consists of a nozzle, which has an elongate mouth 47, which is also lined by seals 48, 49 and 50. The longitudinally extending seal 49, which is nearest to the walls 15, 16, is engageable with the top edge of the glass plate 40. The second longitudinally extending seal 48, which is parallel to the seal 49, protrudes somewhat further than the latter and is engageable with the spacer 41 (see FIG. 13). The sealing pieces 50 provided at the ends protrude to the same extent as the seal 48. The suction device 33 is disposed in the aperture 20 between the two walls 15 and 16 in such a manner that the nozzle can be moved up and down in front of the suction cups 21. The showing in FIG. 11 differs from that in FIGS. 1 and 4 in that the suction cups are combined in a bar, which extends from bottom to top and which on its front side is divided into fields by vertically extending seals 52 and horizontally extending seals 53. A suction opening 54 is provided at the center of each of said fields. The nozzle 33 is secured to arms 55, which extend rearwardly toward both sides of the bar 51 and are pivoted to two levers 56 and 57, which are pivoted in turn to a, carriage 58. The arms 55, the levers 56 and 57 and the carriage 58 jointly constitute a four-bar linkage. The carriage 58 is disposed behind the bar 51 and can be moved up and down by a chain 59. On both sides of the bar 51 the bottom lever 56 of the four-bar linkage extends to such a distance beyond the pivot provided on the arms 55 that the lever protrudes beyond the forward side of the walls 15 and 16. Besides, that lever is arranged on such a low level that its underside will be disposed below the nozzle mouth 47 as long as the nozzle is not yet seated on the glass plate 40.

A passage 60 leads from the nozzle to the suction side of a fan, not shown.

The apparatus operates as follows:

When the lifting beams 5 and 18 have been lowered a glass plate 40 which stands on the rollers 3 and leans against the backing wall 6 is transported into the apparatus. The position and length of the glass plate 40 are consecutively detected by the sensors 30, 28 and 29. If the glass plate is long, it will be arrested at the stop 27. If the glass plate is so short that its rear edge would no longer be adjacent to the wall 15 at the time at which the glass plate is arrested by the stop 27, the plate will be arrested in front of the stop 26. This will ensure that the glass plate when it has come to rest will cover the aperture 20 throughout its length.

The lifting beam 3 is then raised to lift the glass plate 40 from the rollers 3. Thereafter the walls 15 and 16 are jointly approached to the glass plate 40 and the glass plate is sucked in that air is sucked through the bores 35 in the walls 15 and 16. When the glass plate 40 has thus been sucked, it is retracted together with the walls 15 and 16 and is now suspended on the walls 15 and 16 and is supported at its bottom edge by the supports 19, which have been raised in the meantime. Then the suction cups 21 are activated so that they additionally suck the glass plate 40 adjacent to the aperture 20. When the suction cups 21 have been fixed by suction to the outside surface of the glass plate 40, they retract over a distance, preferably by about 2 mm, to bend the glass plate 40 mainly adjacent to the aperture 20.

During that time the supports 4 are lowered and a further glass plate 42 is conveyed on the rollers 3. That further glass plate has the same size but is provided with a spacer 41 and is positioned in registry with the glass plate 40 and is raised from the rollers 3 by the supports 4. The spacer 41 is coated on both sides with an adhesive.

The walls 15 and 16 are now jointly approached to the wall 6 until the glass plate 40 (which in the language of the claims is the "second" glass plate) contacts the spacer 41 so that the space between the two glass plates 40 and 42 is closed except for two gaplike openings 43 at the top and bottom edges of the glass plate d0. The lower opening 43 is then covered by the nozzle 31 (FIGS. 7 and 8) and the suction device 33 is lowered from above to descend in front of the suction cups 21 initially at a certain distance therefrom. But as soon as the two levers 56 and 57 have engaged the top edge of the glass plate 40 a continued descent of the carriage will impart an upward pivotal movement to the levers 56 and 57 so that the suction device 33 will be pulled against the suction cups 21. The arrangement is such that the seal 49 will engage the top edge of the glass plate 40 in any case; this can readily be ensured because that edge will always contact the suction cups 21 regardless of the size and thickness of the glass plate 40 so that that edge will be in a predetermined position.

Figure 9A:
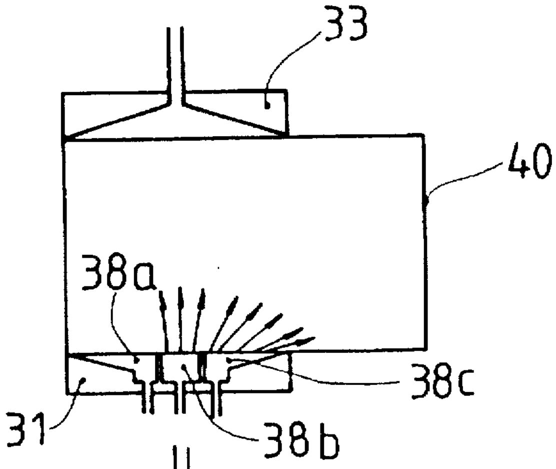
Figure 9B:
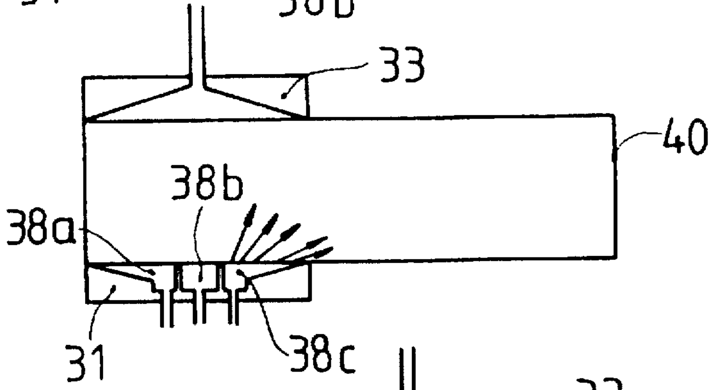
Figure 9C:
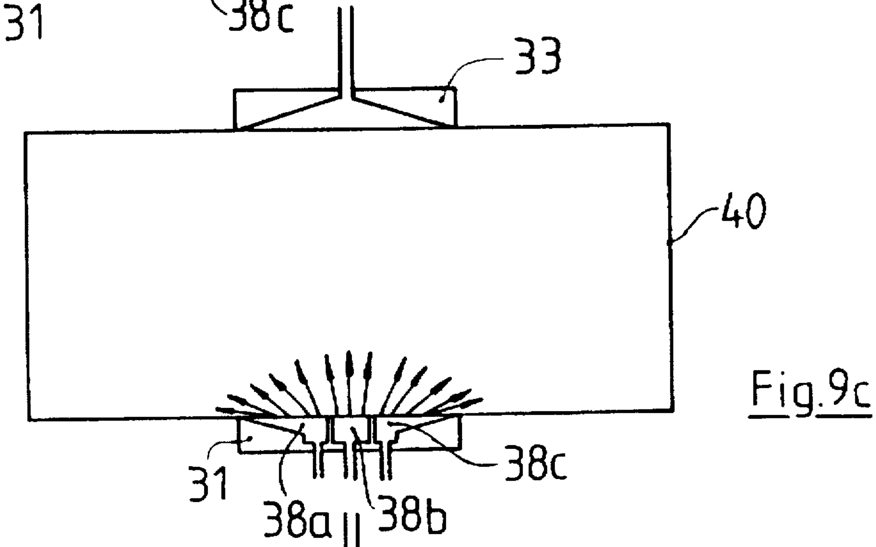
Figure 9D:
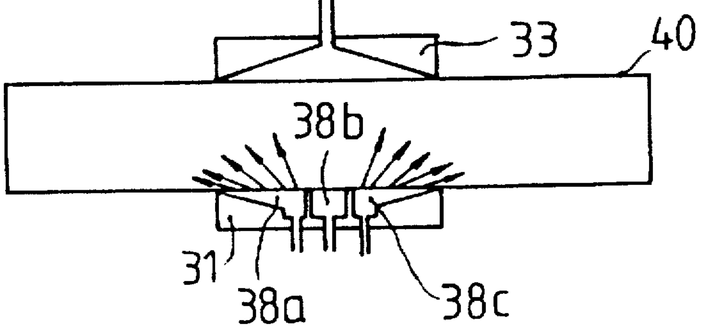

A heavy gas is then fed from below into the interior space between the two glass plates 40 and 42 and suction is effected from above. The filling operation may be performed in various ways in dependence on the size of the insulating glass pane. Some examples are shown in FIGS. **9*a* to 9*d*. In FIG. 9*a* an insulating glass pane is filled which is relatively small in size. That pane is positioned against the inner stop 26 and is filled through the intermediate and right-hand sections 38*b* and 38*c* of the nozzle 31. That mode of operation will be preferred for insulating glass panes having a length of up to 2 meters. FIG. 9*b* shows the filling of a narrower insulating glass pane, which has a length not in excess of about 2 meters and for that reason is also positioned against the inner stop 26 (FIG. 2). Such insulating glass pane can be filled sufficiently quickly and uniformly only through the right-hand section 38*c* of the nozzle 31. FIG. 9*c* shows the filling of a large insulating glass pane, which is positioned against the outer stop 27 (FIG. 2). In that case the nozzle 31 is arranged to act in the intermediate portion of such glass plate and the gas is fed through all three sections 38*a*, 38*b* and 38*c*. That mode of operation is suitable for insulating glass panes which are longer than 2 meters and are not too low. Insulating glass plates having a corresponding length but lower height are suitably filled in the manner shown in FIG. 9*d* through the right- and left-hand sections of the nozzle 31 whereas the intermediate section 38*b*** remains closed.

When the interior space between the glass plates 40 and 42 has sufficiently been filled with the heavy gas, the nozzle 31 and the sucking device 33 are removed from the edge of the insulating glass pane and the suction cups are relieved from pressure at the same time so that the glass plate 40 is suddenly resiliently moved against the spacer 41 and very quickly effects a tight seal of the insulating glass pane. The fluid-operable cylinders 13 are then operated to force the walls 15 and 16 against the backing wall 6 so that the insulating glass pane is pressed to its specified thickness in known manner.

When the press has been opened the supports 4 and 19 are lowered and the pressed insulating glass pane is carried off on the rollers 3.

In the further illustrative embodiments, the same reference characters are used to designate components which correspond or are equal to parts of the first illustrative embodiment. For this reason reference can be made to the first illustrative embodiment in the description of the following illustrative embodiments in order to avoid repetition.

The means 31 which are shown in FIGS. 14, 15 and 16 and serve to feed the gas into the interior space of the insulating glass pane differ from the means illustrated in FIGS. 5 to 8 in that they comprise a nozzle 61 having a very elongate mouth **61*a* and, in addition thereto, comprise two further nozzles 62 and 63, which also have elongate mouths 62*a* and 63*a* but are much shorter than the nozzle 61, which constitutes the main nozzle. Whereas the main nozzle 61 discharges in a substantially upward direction, the two shorter nozzles 62 and 63 are directed in approximately mutually opposite, inclined lateral directions, i.e., toward the rising legs of the spacer when the device 31 engages the bottom edge of an insulating glass pane, as is shown in FIGS. 15 and 18. As a result the two nozzles 62 and 63** constitute a V-shaped array, which is to include a large angle, which is preferably larger than 120° and particularly about 150°, so that a flow reaching the two upper corners of the interior space of the pane can be enforced even in narrow insulating glass panes having a large length and a small height.

Figure 6:
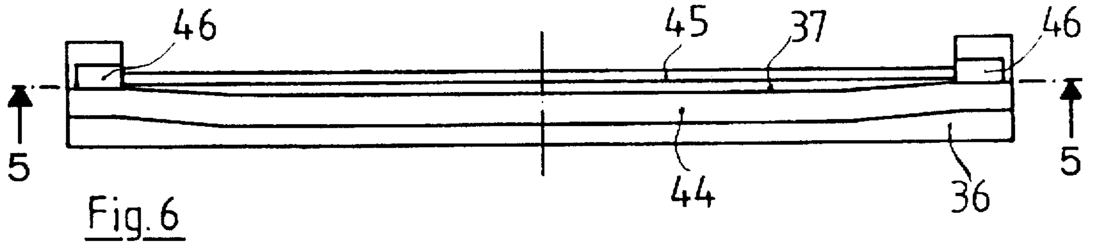
FIG. 6 is a top plan view showing the nozzle of FIG. 5.

The three nozzles 61, 62 and 63 are contained in a narrow chamber 67, which has an elongate mouth, which has the same contour as the means shown in FIG. 6 and is similarly lined by seals 44, 45 and 46, by which the means are contacted with the bottom end of the insulating glass pane (see FIG. 15).

By means of such means the feeding of the gas into the interior space of the insulating glass pane is preferably effected as follows: A gas which is heavier than air is initially fed into the interior space of the insulating glass pane through the main nozzle 61 in a large width and initially at a low rate so that the gas can spread along the bottom edge of the insulating glass pane as far as into the two lower corners of the interior space. The flow rate of the gas is then gradually increased so that the heavy gas forms a rising front by which the air is displaced from the interior space through a gaplike opening provided at the top edge of the insulating glass pane. In FIG. 18 it is illustrated by a family of lines 68 how the front proceeds from bottom to top. When it reaches the gap at the top edge of the insulating glass pane, the main nozzle 61 is closed and the nozzles 63 and 62 of the V-shaped array' are opened instead so that—as is indicated by the lines 69—a flow is enforced which reaches the two upper corners of the interior space of the pane. Adjacent to the upper corners said flow is deflected and a swirl is imparted to it so that the air is purged out of the upper region of the corners. To ensure that the air will not be distributed in the interior space of the pane by the resulting swirling flow but will leave the interior space of the pane through the gap disposed at the top edge of the insulating glass pane the gas is permitted to flow out of the V-shaped nozzles 62 and 63 only for a short time and thereafter the main nozzle 61 is opened again so that the rising flow from said main nozzle will displace out of the interior space of the pane the air which has been purged out of the region of the two upper corners by the action of the nozzles 62 and 63 of the V-shaped array. In that manner it is possible to fill insulating glass panes with a gas other than air very quickly and so as to leave only a small residual content of air.

FIG. 17 shows how the filling operation using the main nozzle 61 is suitably performed. The gas flow rate is initially low and should be the lower the larger is the length of the insulating glass pane to be filled so that the heavy gas can flow along the bottom edge of the pane to the two lower corners of the interior space of the pane before the flow rate is increased to a maximum, which should be so low that turbulence in the interior space of the pane will substantially be avoided. For this reason the right-hand curve in FIG. 17 is applicable to longer insulating glass panes and the left-hand one for shorter ones.

FIGS. 19 to 21 show a covering element for partly covering during the filling operation the gap formed at the top edge of the insulating glass pane. That covering element 70 may desirably be used instead of the suction nozzle illustrated in FIGS. 10 to 13 and just as the nozzle is secured to a carriage 58, which is movable up and down. The covering element 70 consists of a plate which extends between the walls 15 and 16 substantially vertically in front of the suction bar 51 and is pivoted to the carriage 58 by a horizontal pivot 71. In its upper portion the covering element 70 is provided on the rear with a seal 72 and at its bottom edge with a seal 73, which during the descent of the carriage 58 engages the spacer 41 of the insulating glass pane so that the covering element 70 is then raised until its upper seal 72 engages the suction bar 51. For this reason the air which escapes from the gap 74 cannot freely flow off upwardly but is laterally deflected and must flow to the right-hand and left-hand edges of the covering element 70 before flowing into the open. That restriction of the escape of air will desirably promote the generation of a lateral flow in the interior space of the pane.

A narrow line 75 is integrated in the covering element 70 and serves to suck a small part of the air or air-gas mixture leaving the gap 74 and to deliver that sucked-off part to a sensor, by which the oxygene content is measured for an indication of the residual content of air which is still in the pane.

The apparatus shown in FIGS. 22 and 23 comprises numerous elements which are also provided in the apparatus illustrated in FIGS. 1 to 4 so that reference can be mace to the description of said parts illustrated there. The apparatus illustrated in FIGS. 22 and 23 differs from the apparatus shown in FIGS. 1 to 4 in that no glass plate is bent in the former. For this reason the suction cups 21 are omitted and the backing wall. 6 is disposed opposite to only one wall 15, which is designed as an air cushion wall, rather than to two walls 15 and 16 which are separated by a gap 20. The wall 15 is pivotally movable through a small angle about a pivot 76, which in the top plan view of FIG. 23 is seen at the right-hand end of the wall 15 and extends parallel to the forward side of the wall 15 in a vertical plane. Besides, the wall 15 can be displaced parallel to the backing wall as has been described with reference to FIG. 1.

The apparatus operates as follows:

When the walls 6 and 15 are parallel to each other, a glass plate 40 is fed in on the rollers 3 and is positioned against the stop 27 and sucked by the air cushion wall 15 and by a parallel displacement of the air cushion wall 15 is disengaged from the backing wall 6. Thereafter another glass plate 42, which has been provided with a spacer 41, is fed in and is positioned against the stop 27. The air cushion wall 15 is pivotally moved through a small angle about the pivot 76 so that an acute angle is included by the backing wall 6 and the wall 15. Thereafter the wall 15 is approached to the backing wall 6 by a parallel displacement until the glass plate 40 reaches that leg of the spacer 41 which is shown on the right in the top plan view of FIG. 23. At that time there is a wedge-shaped gap, which is exaggerated in FIG. 23, between the glass plate 40 and the top and bottom legs of the spacer and there is a narrow rectangular gap, which is only about 2 mm wide, between the glass plate 40 and that leg of the spacer 41 which is seen on the left in the top plan view. Before the filling of the interior space of the insulating glass pane the top and bottom wedge-shaped gaps can be covered, e.g., by a bar which is covered with foamed rubber or by high-strength flexible inflatable tubes 77 and 78, which are displaceable. The gap at the left-hand edge of the insulating glass pane is covered in its lower portion by means 31 for feeding the gas, which is fed at the bottom into the interior space of the insulating glass pane and displaces the air out of an uncovered upper portion of the gaplike opening. After the filling operation the wall 15 is pivotally moved against the backing wall 6 until the former is parallel to the latter so that the insulating glass pane is closed and can be carried off while standing on the rollers 3 when the wall 15 has been retracted.

We claim:

1. A process of assembling generally rectangularly configured insulating glass plates, each of said plates having corresponding vertical and horizontal extents defined by respective vertical and horizontal edges, each of said plates having an inside surface, an outside surface and whereby an interior space is defined by and disposed between the interior surfaces of a first and a second glass plate, the interior space initially being filled with a volume of air that is later displaced by a gas heavier than air, the first and second glass plates being spaced apart from each other and sealed along their vertical and horizontal edges by a spacer disposed therebetween when assembled, said spacer having a pair of opposed adhesive sides, comprising the steps of:

joining one side of the adhesive spacer to one of the first and second glass plates along all of said edges of said one glass plate;

joining the other of the first and second glass plates to the spacer only along one of the edges of the other glass plate such that the first and second glass plates have one corresponding edge concurrently joined to said spacer, said plates positioned to extend at an acute angle with respect to one another, thereby forming and defining a vertex at said joined edges, said concurrently joined edges of each of said glass plates being adhesively joined to and closed by said spacer, the acute angle between said glass plates forming a gap to the interior space along all of said other edges except said adhesively joined and closed edges, said gap providing a heavy gas access to said interior space;

permanently closing the heavy gas access to trap the heavy gas in the interior space by removing said gas introduction means and said temporary covering means from said plates and pivoting the other glass plate towards said one glass plate, thereby joining said remaining edges of said other glass plate to said adhesive spacer.

* * * * *